US007805362B1

(12) United States Patent
Merrell et al.

(10) Patent No.: US 7,805,362 B1
(45) Date of Patent: Sep. 28, 2010

(54) METHODS OF AND SYSTEMS FOR MONEY LAUNDERING RISK ASSESSMENT

(75) Inventors: Daniel James Merrell, Fair Oaks Ranch, TX (US); Susan Beth Van Horn, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 357 days.

(21) Appl. No.: 11/548,229

(22) Filed: Oct. 10, 2006

(51) Int. Cl.
G06Q 40/00 (2006.01)
(52) U.S. Cl. ............................. 705/38; 705/36; 705/39
(58) Field of Classification Search ................ None
See application file for complete search history.

(56) References Cited

U.S. PATENT DOCUMENTS

| | | | |
|---|---|---|---|
| 6,418,436 B1 * | 7/2002 | Degen et al. ............... 707/6 |
| 7,505,931 B2 * | 3/2009 | Da Silva ................. 705/35 |
| 2002/0138407 A1 * | 9/2002 | Lawrence et al. ........... 705/38 |
| 2004/0030649 A1 * | 2/2004 | Nelson et al. .............. 705/44 |
| 2004/0078321 A1 * | 4/2004 | Lawrence ................ 705/38 |
| 2004/0117299 A1 * | 6/2004 | Algiene et al. ............. 705/39 |
| 2004/0117316 A1 * | 6/2004 | Gillum ................... 705/64 |
| 2005/0137016 A1 * | 6/2005 | Enzminger et al. ......... 463/42 |
| 2005/0267827 A1 * | 12/2005 | Grant et al. .............. 705/35 |
| 2005/0288941 A1 * | 12/2005 | DuBois et al. ............. 705/1 |
| 2006/0247992 A1 * | 11/2006 | Song et al. ............... 705/35 |
| 2006/0259336 A1 * | 11/2006 | Anas et al. ............... 705/7 |
| 2007/0100744 A1 * | 5/2007 | Wu et al. ................ 705/38 |

OTHER PUBLICATIONS

*Bank Secrecy Act/Anti-Money Laundering Examination Manual* [online]. Federal Financial Institutions Examination Council, 2006 [retrieved on Sep. 11, 2006]. Retrieved from the Internet<URL: http://www.ffiec.gov/pdf/bsa_aml_examination_manual2006.pdf> pp. 1-367.
"Considerations When Performing Anti-Money Laundering Risk Assessments", ADI Consulting, 2006, 4 pages.
*Money Laundering* [online]. *Wikipedia*, [retrieved on Sep. 11, 2006]. Retrieved from the Internet: <URL: http://www.en.wikipedia.org/wiki/Money_laundering> pp. 1-7.

(Continued)

*Primary Examiner*—Thomas Dixon
*Assistant Examiner*—Benjamin S Fields
(74) *Attorney, Agent, or Firm*—Brooks, Cameron & Huebsch, PLLC (57) ABSTRACT

A method of assessing money-laundering risk of an individual includes gathering geographic information, personal information, and product information regarding the individual, determining a risk value of the geographic information, a risk value of the personal information, and a risk value of the product information, weighting each of the geographic information risk value, the personal information risk value, and the product information risk value, and summing the weighted risk values to yield a money-laundering risk score.

18 Claims, 2 Drawing Sheets

OTHER PUBLICATIONS

Burt, Sue *AML Risk Assessments: Guidance for the Community Banker* [online]. *Compliance Headquarters* [retrieved on Sep. 11, 2006]. Retrieved from the Internet: <URL: http://www.complianceheadquarters.com/AML/AML_Articles/9_29_04.html> pp. 1-4.

*Corporate Citizenship: Anti-Money Laundering* [online]. *Citigroup* [retrieved on Sep. 12, 2006]. Retrieved from the Internet: <URL: http://www.citigroup.com/citgroup/citizen/antimoneylaundering/index.htm> pp. 1-3.

Sohn, Ira; "A Primer on Money Laundering: The Dark Side of Capital Account Liberalization", International Trade and Finance Association, 2002, 20 pages.

Manu, Joseph; *Your Money Under More Scrutiny* [online]. *Wired News* [retrieved on Sep. 12, 2006]. Retrieved from the internet: <URL: http://www.wired.com/news/privacy/1,67249-0.html> Apr. 27, 2005, pp. 1-4.

\* cited by examiner

METHODS OF AND SYSTEMS FOR MONEY LAUNDERING RISK ASSESSMENT

CROSS-REFERENCE TO RELATED APPLICATIONS

This patent application is related in subject matter to, and incorporates by reference herein in its entirety, each of the following:

a U.S. patent application Ser. No. 11/548,225 entitled METHODS OF AND SYSTEMS FOR MONEY-LAUNDERING RISK ASSESSMENT, filed on the same date as this patent application; and a U.S. patent application Ser. No. 11/548,235 entitled METHODS OF AND SYSTEMS FOR MONEY-LAUNDERING RISK ASSESSMENT, filed on the same date as this patent application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

Disclosed embodiments relate generally, by way of example and not limitation, to systems and methods that permit a risk of money-laundering activity to be assessed.

2. History of Related Art

Money laundering, the metaphorical "cleaning of money" with regard to appearances in law, is the practice of engaging in specific financial transactions in order to conceal the identity, source, or destination of money. The term "money laundering" has traditionally been applied only to financial transactions related to organized crime. However, in recent years, the definition of money laundering has been expanded by government regulators (e.g., United States Office of the Comptroller of the Currency) to encompass any financial transaction that generates an asset or a value as the result of an illegal act. Thus, money laundering is now recognized as potentially practiced by individuals, small and large business, corrupt officials, members of organized crime (e.g., drug dealers or the Mafia) or of cults, and even corrupt states or intelligence agencies.

Anti-money laundering (AML) is a term mainly used in the finance and legal industries to describe legal controls that require financial institutions and other regulated entities to prevent or report money laundering activities. For example, financial institutions must perform due diligence by having proof of a customer's identity and that the use, source, and destination of funds do not involve money laundering.

In part due to stringent requirements of the U.S. Patriot Act, which was enacted after the Sep. 11, 2001 terrorist attacks in an effort to choke the supply of terror funds, anti-money-laundering efforts have achieved an unprecedented importance on the agendas of U.S. financial institutions. In light of the heightened importance to financial institutions of impeding money laundering, it would be advantageous to allow financial institutions to more effectively focus resources on those customers that present a higher risk for money laundering.

SUMMARY

This summary is not intended to represent each embodiment or every aspect; the following paragraphs of this summary provide representations of some embodiments as aspects thereof.

A method of assessing money-laundering risk of an individual includes gathering geographic information, personal information, and product information regarding the individual, determining a risk value of the geographic information, a risk value of the personal information, and a risk value of the product information, weighting each of the geographic information risk value, the personal information risk value, and the product information risk value, and summing the weighted risk values to yield a money-laundering risk score.

A system of assessing money-laundering risk of an individual includes a server adapted to gather geographic information, personal information, and product information regarding the individual, determine a risk value of the geographic information, a risk value of the personal information, and a risk value of the product information, weight each of the geographic information risk value, the personal information risk value, and the product information risk value, and sum the weighted risk values to yield a money-laundering risk score. The system also includes at least one database interoperably coupled to the server.

An article of manufacture for assessing money-laundering risk of an individual includes at least one computer readable medium and processor instructions contained on the at least one computer readable medium. The processor instructions are configured to be readable from the at least one computer readable medium by at least one processor and thereby cause the at least one processor to operate as to gather geographic information, personal information, and product information regarding the individual, determine a risk value of the geographic information, a risk value of the personal information, and a risk value of the product information, weight each of the geographic information risk value, the personal information risk value, and the product information risk value, and sum the weighted risk values to yield a money-laundering risk score.

BRIEF DESCRIPTION OF THE DRAWINGS

A more complete understanding of methods and systems may be obtained by reference to the following Detailed Description when taken in conjunction with the accompanying Drawings wherein.

DETAILED DESCRIPTION

Methods and systems will now be described more fully with reference to the accompanying drawings in which various embodiment(s) are shown. The methods and systems may, however, be embodied in many different forms and should not be construed as limited to the embodiments set forth herein; rather, these embodiments are provided so that this disclosure will be thorough and complete, and will fully convey the scope of the systems and methods to those skilled in the art.

Various embodiments of the methods and systems set forth herein include a mathematical algorithm that may be used as part of an AML effort. The mathematical algorithm combines specific attributes about a financial-institution customer, assigns scores and weights to the attributes, and calculates an aggregate customer money-laundering risk score. The risk score may then be used in an effort to determine an extent of due diligence required for the customer as well as a frequency of monitoring that may be applied to the customer's account activity for AML purposes.

Various embodiments group customer attributes into three primary risk categories: 1) people; 2) product; and 3) geography. In a typical embodiment, the aggregate risk score is created by first assigning an overall weight to each of the risk categories and adding together weighted risk measurements. Table 1 depicts illustrative individual customer attributes within each risk category:

TABLE 1

| People | Product | Geography |
|---|---|---|
| Citizenship | Product | City |
| Occupation | Channel | State |
| Select Customer | | Country |
| Length of relationship | | Zip Code |
| | | Phone Number |

Within each risk category, the various individual customer attributes may be assigned risk scores. In various embodiments, the risk scores are multiplied by customer attribute weights to produce an overall risk category score. Certain customer attributes, which are considered key indicators requiring enhanced due diligence, are assigned trump scores. A trump score assures that a minimum risk score is assigned to a risk category whenever a key indicator attribute is present. Trump scores are typically applied to the customer attributes of citizenship, country, and area code.

Geography Risk Category

Within the Geography risk category, a plurality of attributes can be defined. In some embodiments, five key attributes are used to indicate a customer's physical location. Knowing where a customer is physically located is helpful for compliance with AML and Office of Foreign Assets Control (OFAC) laws and regulations. The OFAC is an office of the United States Department of the Treasury that administers and enforces economic and trade sanctions based on U.S. foreign policy and national security goals against targeted foreign countries, terrorists, international narcotics traffickers, and those engaged in activities related to the unapproved proliferation of weapons of mass destruction. The OFAC acts under presidential wartime and national emergency powers, as well as authority granted by specific legislation, to impose controls on transactions and freeze foreign assets under U.S. jurisdiction. The Specially Designated Nationals list provides financial and other institutions with the names of those individuals and organizations that are currently prohibited from engaging in financial transactions.

In a typical embodiment, government sources, such as lists maintained by the High Intensity Drug Trafficking Areas (HIDTA) and the OFAC, are used to identify geographical areas that pose a higher risk for money laundering activity. Typical geographic attributes and scoring standards include: 1) city; 2) state; 3) country; 4) zip code; and 5) phone number.

City Risk Attribute

In a typical embodiment, city risk is identified using the Office of National Drug Control Policy's Profile of Drug Indicator Reports in order to identify cities within the United States that are major drug distribution ports, drug transit areas, drug proceeds hubs, or drug trans-shipment areas. For example, outside of the U.S., foreign cities not specified by these sources may be considered a medium risk due to the lack of money laundering controls and government oversight that may exist in these locations. In various embodiments, city risk may be assigned as follows: 1) high—U.S. cities that function as major drug distribution ports, drug transit areas, drug proceed hubs, and drug trans-shipment areas selected from the High Intensity Drug Traffic Areas (HIDTA) as identified by the Office of National Drug Control Policy; 2) medium—all foreign cities; and 3) low—all other U.S. cities not specified in the high category.

State Risk Attribute

In a typical embodiment, state risk is identified using the High Intensity Financial Crime Areas (HIFCA) identified by the Financial Crimes Enforcement Network (FinCEN). This HIFCA list identifies specific states and counties that have the highest volume of Bank Secrecy Act filings and the highest levels of law enforcement responses to money laundering concerns within the U.S. Foreign states and provinces not specified by these sources are identified as medium risk due to the lack of money laundering controls and government oversight that may exist in these locations. State risk is assigned as follows: 1) high—domestic states and counties that were identified as HIFCA according to standards established by the FinCEN; 2) medium—all foreign states and provinces; and 3) low—all other states within the U.S. not specified in the high category.

Country Risk Attribute

In a typical embodiment, countries are evaluated to determine which countries present the greatest money laundering, terrorist financing, and drug trafficking risks. For example, the OFAC list of sanctioned countries and the Financial Action Task Force (FATF) Non-Cooperative Countries and Territories (NCCT) list may be used to identify high risk countries. Additionally, countries identified by the HIDTA as international drug sources and transit zones may be considered to carry high levels of money laundering risk. In various embodiments, all other foreign countries not specified by one of these sources may be considered a medium risk due to the lack of money laundering controls and government oversight that may exist in these locations. Country risk is assigned as follows: 1) high—countries that are sanctioned by the OFAC and countries and territories on the NCCT designated by the FATF and HIDTA International Drug Sources and Transit Zone Countries; 2) medium—all other foreign countries not specified in the high category; and 3) low—domestic states and U.S. territories not specified in the high category.

Zip Code Attribute

In a typical embodiment, zip codes are identified that represent the geographic areas associated with higher risk cities, counties, and states assessed in other attribute categories. For example, the data source for this attribute may be the primary address of the customer and, as a result, may include a U.S. zip code or a foreign postal code. Since city, county, and state boundaries may or may not align geographically, zip codes allow the mathematical algorithm to include more options. Zip code risk is assigned as follows: 1) high—cities, counties, and states recognized by the HIDTA or HIFCA as areas with a higher risk for money laundering and criminal activity; 2) medium—all other foreign postal codes not specified in the high category; and 3) low—domestic zip codes not specified in the high category.

Phone Number Attribute

In typical embodiment, international telephone country codes are identified for the countries identified in the country attribute as posing the highest concern for money laundering activity. In particular, the telephone country codes assigned to known OFAC, NCCT, or HIDTA countries may be considered the highest risk. Telephone country codes for all other foreign countries may be considered a medium risk due to the lack of money laundering controls and government oversight that may exist in these locations. Phone number risk is assigned as follows: 1) high—telephone country codes assigned to OFAC-sanctioned countries, HIDTA international drug sources and transit-zone countries, and countries on the NCCT list; 2) medium—all other international telephone country code numbers not listed in the high category, the U.S. Virgin Isles, and Puerto Rico; and 3) low—the U.S. and U.S. territories, excluding Puerto Rico and the U.S. Virgin Isles.

People Risk Category

Within the People risk category, attributes can be identified that indicate a potentially higher level of risk for money laundering, drug trafficking, or terrorist financing. In a typical embodiment, the mathematical algorithm uses a customer's citizenship, occupation, net worth, and length of relationship with a financial institution in an effort to assess money-laundering risk. The people risk attributes may include citizenship, occupation, net worth, and length of relationship with the financial institution.

Citizenship Risk Attribute

In a typical embodiment, the countries of citizenship are evaluated to determine which present the greatest money laundering, terrorist financing, and drug trafficking risks. Individuals who are citizens of OFAC sanctioned countries, FATF NCCT countries, and countries that have been identified as having weak anti-money laundering laws or controls are considered to present the highest risk. All other foreign citizens are typically considered a higher risk due to the lack of money laundering controls and government oversight that may exist in these locations. The citizenship risk scores are assigned as follows: 1) high—citizens of OFAC Sanctioned Countries, NCCT Countries, and HIDTA International Drug Source and Transit Zones Countries; 2) medium—citizens of foreign countries other than the OFAC, NCCT, & HIDTA International Drug Source and Transit Zone Countries; and 3) low—citizens of the U.S. and U.S. territories.

Occupation Risk Attribute

In a typical embodiment, occupation codes assigned to customers are evaluated to determine which present the greatest money laundering risk. The occupations that are deemed as the highest risk for money laundering, drug trafficking, or terrorist financing are grouped into categories and assigned a risk score of high. Occupations that present a higher risk for money laundering or tax evasion are designated as a medium risk. Occupation risk is assigned as follows: 1) high—occupations or characteristics related to high net worth, cash-intensive, public office, legal/accounting/financial, art/jewelry, antiques, import/export, drug-related, military/law enforcement, and weapons/warfare; 2) medium—other cash-intensive occupations that usually involve smaller dollar amounts; and 3) low—all other occupation selections.

Select Customer Attribute

In various embodiments, a financial institution assigns select status to customers who maintain assets at the financial institution above certain thresholds or who conduct substantial levels of business with the financial institution across multiple product lines. Select customers are considered a higher risk due to the larger balances usually associated with these accounts. Select customer risk is assigned as follows: 1) high—all customers designated as Select; 2) medium—NA; and 3) low—all customers who do not qualify as a Select customer.

Length of Relationship Attribute

In various embodiments, the mathematical algorithm considers the length of relationship that the financial institution has with a customer. Extended customer relationships afford the financial institution the opportunity to perform trend analysis and gain a greater understanding of a customer's transaction behavior. Length of relationship risk is assigned as follows: 1) high—the period of 0-24 months is designated as the high-risk category since the customer's relationship is new to the financial institution and the customer does not have a lengthy transaction history with the financial institution; 2) medium—the period of 25-120 months is designated as the medium-risk category; and 3) low—the period of 121 months and above is designated as the low-risk category because these customers have longstanding relationships and transaction histories with the financial institution.

In addition to the above, the financial institution may perform additional customer risk analyses, for example, by screening customers against lists such as PEP lists and the OFAC Specially Designated Nationals and Blocked Persons (SDN) List. In typical embodiments, financial institutions may refuse to conduct transactions with, or provide a product or service to, any persons listed on the OFAC SDN list.

Product Risk Category

Within the Product risk category, channel and product risks associated therewith are assessed.

Product Risk Attribute

In a typical embodiment, risk criteria applied to this assessment include products and services that possess cash value, allowance for cancellation and refunds, accessibility through .com channels, easy convertibility to cash, transactions in fine jewelry, precious stones or diamonds, allowance of debit/ATM withdrawals, and fund transfer capabilities. Product risk scores are assigned as follows: 1) high—brokerage, mutual fund, and bank products that have check writing or debit cards, products that allow wire transfers, credit card and bill pay products, life insurance products with a cash value and cancellation feature, precious stone products, and products available for refund; 2) medium—brokerage, mutual fund and bank products that have a cash value but no check-writing or debit cards, certificates of deposit, and individual retirement accounts; and 3) low—all other financial products.

Channel Risk Attribute

In a typical embodiment, within the channel risk category, customers that use the internet to conduct business present the highest money-laundering risk. Although many financial institutions maintain strong authentication and controls over internet services, the inherent risks and 24/7 access to these services make the internet services more susceptible to money laundering abuse than other channels. Channel risk scores are assigned as follows: 1) high—customers who had at least one internet session during the preceding three-month period; 2) medium—NA; and 3) low—customers who had no internet sessions in the preceding three-month period.

Reference Tables

In various embodiments, risk attributes are managed via maintainable reference tables. The mathematical algorithm utilizes the maintainable reference tables as look-up tables in order to assign attribute scores and risk-category weights.

Access to the maintainable reference tables is restricted to personnel with proper access credentials and changes are documented in a change control log. As a financial institution's internal and external environments change, data in the reference tables may be adjusted as desired. When the algorithm encounters a null value for any risk attribute, a default value is assigned by the algorithm for purposes of calculating the customer's risk score. In various embodiments, a customer AML risk assessment process is run periodically to take into account changes that may occur to a customer's score over time.

A risk-assessment mathematical algorithm may be used by financial institutions to prioritize customers for investigation for money laundering. Those having skill in the art will appreciate that the algorithm does not replace business judgment nor does it determine who has engaged in money laundering. Instead, the algorithm attempts to assess which customers are more likely than others to engage in money laundering based on a combination of people, geography, and product risk attributes.

Equation (1) is a mathematical-formula that sets forth a mathematical algorithm that can be used to perform a customer risk assessment in accordance with principles of the methods and systems set forth herein.

$$\text{Score} = \max\left[\left(W_{Geo}\sum_{x=Geo}(w_x v_x) + W_{Peo}\sum_{x=Peo}(w_x v_x) + W_{Prod}\sum_{x=Prod}(w_x v_x)\right), i_1 v_1, i_2 v_2, \ldots\right] \quad (1)$$

In Equation (1), the following variables are used:

$W_{cat}$=weight ranging between 0.0-1.0 assigned to a particular category. ($W_{Geo}+W_{Peo}+W_{Prod}=1$)

$w_x$=weight assigned to attribute x within a given category. (Within each category, $\Sigma w_x=1$.)

$v_x$=value assigned to the member for attribute x. (A higher score denotes a higher level of risk. For example, assume a member lives in the U.S. Then $v_{Country}$ for that member may be 1. Similarly, for a member living in a high-risk country, $v_{Country}$ may be 5.)

$i_n$=value indicating which attribute(s) should be considered overriding on the member's score (i.e., overriding variables) (For example, a member living in a high-risk country may have $v_{Country}$=5. Regardless of the other factors, if $i_{Country}$=1, the member's score would be 5.)

$i_n$=0 or 1.

Equation (1) can be used to calculate an average weight for Geography, People, and Product attributes. These averages may then be weighted together to come up with an average risk score. A trump function is included in Equation (1) so that customers who score high on specific values (e.g., country, citizenship, or area code) can be considered higher risk, regardless of their average scores. The Score is, therefore, the greater of the average score and the scores received on any of these trump-function values.

Calculation Examples

Assume categories and attributes weighted as follows:

TABLE 2

| Geography | 0.40 | People | 0.45 | Product | 0.15 |
|---|---|---|---|---|---|
| City | 0.15 | Citizenship | 0.50 | Products | 0.40 |
| State | 0.05 | Occupation | 0.20 | Channel | 0.60 |
| Country | 0.30 | Select | 0.05 | Total | 1.00 |
| Zip Code | 0.25 | Relationship | 0.25 | | |
| Phone No. | 0.25 | Total | 1.00 | | |
| Total | 1.00 | | | | |

In addition to the above, assume that country, citizenship, and area code are overriding variables (i.e., $i_{Country}=1$, $i_{Citizenship}=1$, $i_{AreaCode}=1$, $i_{AllOther}=0$).

Consider the following two customers:

TABLE 3

| Attributes | Customer 1 Characteristics | Value ($v_x$) | Customer 2 Characteristics | Value ($v_x$) |
|---|---|---|---|---|
| City | San Antonio | 2 | San Antonio | 2 |
| State | TX | 1 | TX | 1 |
| Country | USA | 1 | USA | 1 |
| Zip Code | 78288 | 1 | 78288 | 1 |
| Phone No. | 210 | 1 | 210 | 1 |
| Citizenship | U.S. | 1 | Colombian | 3 |
| Occupation | Actuary | 3 | Actuary | 3 |
| Select Customer | No | 1 | No | 1 |
| Relationship Length | 20 years | 1 | 20 years | 1 |
| Products Owned | 3 | 3 | 3 | 3 |
| Channel | .com | 1 | .com | 1 |

For this example using Tables 2 and 3, values ranging from 1 (low) to 3 (high) are used.

Score Customer 1=max {[0.40(0.15×2+0.05×1+0.30× 1+0.25×1+0.25×1)+0.45(0.50×1+0.20×3+0.05× 1+0.25×1)+0.15(0.40×3+0.60×1)], 1×1,1×1, 0× ... }

=max {[0.40×1.15+0.45×1.40+0.15×1.80], 1, 1, 0}

=max {1.36, 1, 1, 0}

=1.36

Score Customer 2=max {[0.40(0.15×2+0.05×1+0.30× 1+0.25×1+0.25×1)+0.45(0.50×3+0.20×3+0.05× 1+0.25×1)+0.15(0.40×3+0.60×1)],1×1, 1×3, 0× ... }

=max {[0.40×1.15+0.45×2.40+0.15×1.80], 1, 3, 0}

=max {1.81, 1, 3, 0}

=3

It will be apparent to those having skill in the art that the fact that Customer 2 is a Colombian citizen results in Customer 2 having a score of 3, notwithstanding the fact that the average score resulting from Equation (1) without taking the trump function into consideration would have been 1.81. In contrast, Customer 1 had no trump function values that were great enough to exceed the average score resulting from application of Equation (1) to the characteristics of Customer 1; therefore, the risk score of Customer 1 remains 1.36.

Figure 1:
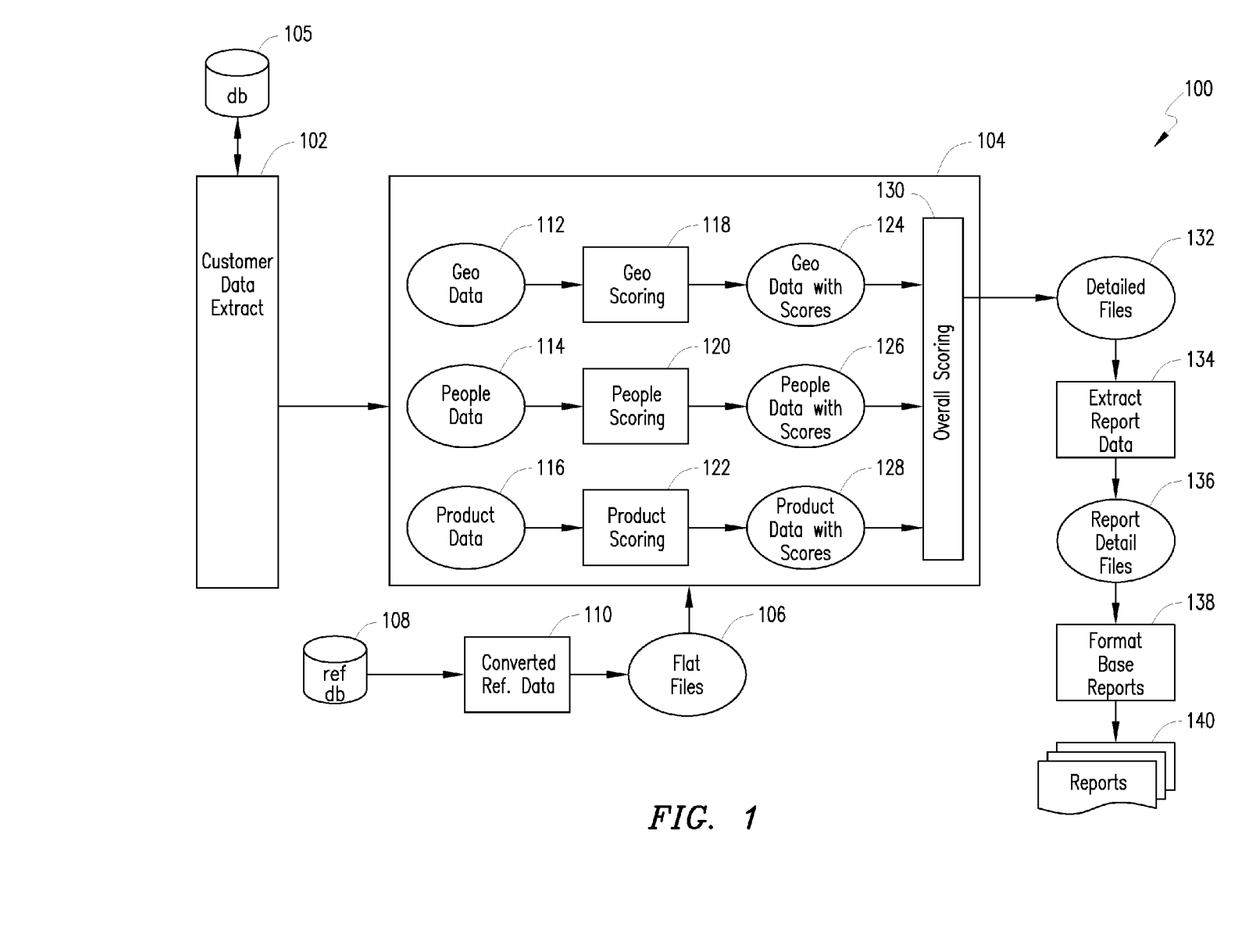
FIG. 1 is a flow diagram of a money-laundering assessment process.

Referring now to the FIGURES, FIG. 1 is a flow diagram of a money-laundering assessment process that can employ Equation (1) above. A process flow 100 begins with a customer data extract 102 from a customer database 105. A single customer database (i.e., the customer database 105) is illustrated within the process flow 100; however, those having skill in the art will appreciate that customer data may be extracted from a variety of sources without departing from principles of the methods and systems as set forth herein.

Following the customer data extract 102, the extracted customer data is provided to a process 104. The process 104 generally depicts the operations involved in a typical implementation of Equation (1). In addition to the input of the customer data extract 102 to the process 104, flat files 106 are also input to the process 104. The flat files 106 are created from converted reference data 110. The converted reference data 110 is obtained from a relational database 108. The relational database 108 houses data regarding the various risk attributes and their assigned values. For example, in the relational database 108, data may be maintained regarding possible values of citizenship, occupation, select customer, length of relationship, product, channel, city, state, country, zip code, and phone number. In a typical embodiment, every U.S. zip code and a risk value associated therewith is stored in the relational database 108. The relational database 108 is, in a typical embodiment, used as a look-up table by the process 104.

It will be apparent to those having skill in the art that values for the various risk attributes can be readily updated as desired. As noted above, the process 104 receives as an input the customer data extract 102. The customer data extract 102 is illustrated within the process 104 as segregated into geographic data 112, people data 114, and product data 116. Geographic scoring 118 has as inputs the geographic data 112 and applicable value data from the flat files 106. In similar fashion, people scoring 112 has as inputs the people data 114 and applicable value data of the flat files 106, while product scoring 122 has as inputs the product data 116 and applicable value data of the flat files 106. The geographic scoring 118, the people scoring 120, and the product scoring 122 each represent processes by which subscores of overall scores of individuals are calculated.

The geographic scoring 118, the people scoring 120, and the product scoring 122 serve as inputs to geographic data with scores 124, people data with scores 126, and product data with scores 128, respectively. The geographic data with scores 124, people data with scores 126, and product data with scores 128 combine to create overall scoring 130. The overall scoring 130 is calculated using as inputs the geographic data with scores 124, the people data with scores 126, and the product data with scores 128. Those having skill in the art will appreciate that, when the overall scoring 130 employs Equation (1), one or more trump functions using an overriding variable may be utilized as dictated by design considerations.

The overall scoring 130 is output to detail files 132. The detail files 132 are utilized to create extract report data 134. From the extract report data 134, report detail files 136 are created. From the report detail files 136, base reports are formatted, which formatting results in reports 140.

Figure 2:
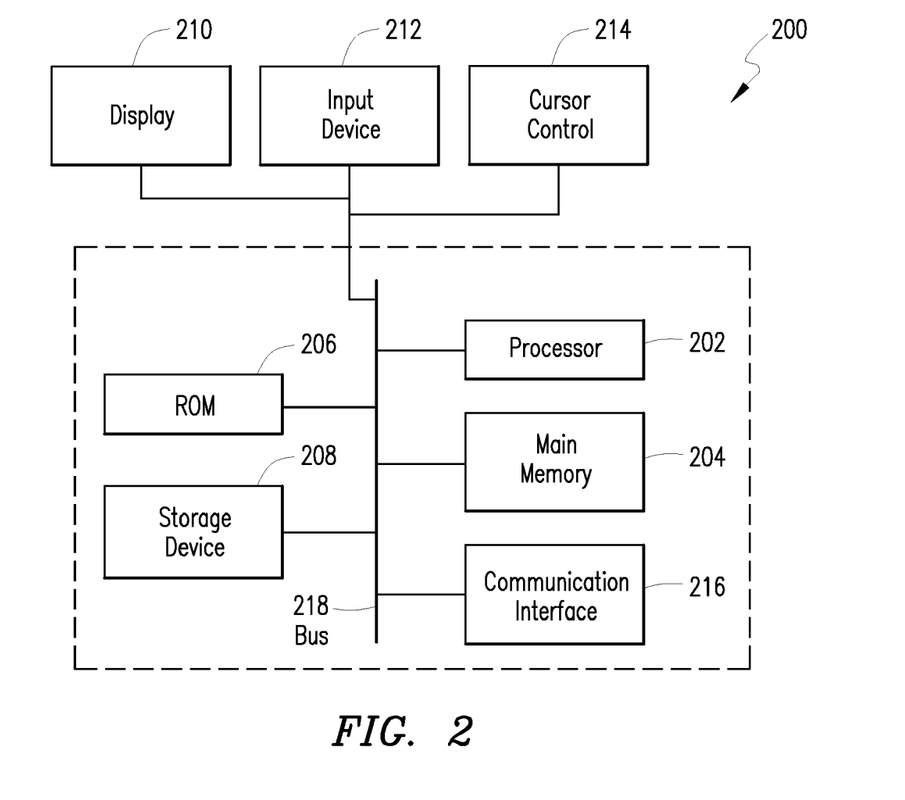
FIG. 2 is a block diagram of an embodiment of a server.

FIG. 2 is a block diagram of an embodiment of a server that may be used to implement various processes as set forth herein. In the implementation shown, a server 200 may include a bus 218 or other communication mechanism for communicating information and a processor 202 coupled to the bus 218 for processing information. The server 200 also includes a main memory 204, such as a random access memory (RAM) or other dynamic storage device, coupled to the bus 218 for storing computer readable instructions to be executed by the processor 202.

The main memory 204 also may be used for storing temporary variables or other intermediate information during execution of the instructions to be executed by the processor 202. The server 200 further includes a read only memory (ROM) 206 or other static storage device coupled to the bus 218 for storing static information and instructions for the processor 202. A computer readable storage device 208, such as a magnetic disk or optical disk, is coupled to the bus 218 for storing information and instructions for the processor 202.

The server 200 may be coupled via the bus 218 to a display 210, such as a cathode ray tube (CRT), for displaying information to a user. An input device 212, including, for example, alphanumeric and other keys, is coupled to the bus 218 for communicating information and command selections to the processor 202. Another type of user input device is a cursor control 214, such as a mouse, a trackball, or cursor direction keys for communicating direction information and command selections to the processor 202 and for controlling cursor movement on the display 210. The cursor control 214 typically has two degrees of freedom in two axes, a first axis (e.g., x) and a second axis (e.g., y), that allow the device to specify positions in a plane.

The term "computer readable instructions" as used above refers to any instructions that may be performed by the processor 202 and/or other component of the server 200. Similarly, the term "computer readable medium" refers to any storage medium that may be used to store the computer readable instructions. Such a medium may take many forms, including, but not limited to, non volatile media, volatile media, and transmission media. Non volatile media include, for example, optical or magnetic disks, such as the storage device 208. Volatile media include dynamic memory, such as the main memory 204. Transmission media include coaxial cables, copper wire and fiber optics, including wires of the bus 218. Transmission can take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 202 for execution. For example, the instructions may initially be borne on a magnetic disk of a remote computer. The remote computer can load the instructions into its dynamic memory and send the instructions over a telephone line using a modem. A modem local to the server 200 can receive the data on the telephone line and use an infrared transmitter to convert the data to an infrared signal. An infrared detector coupled to the bus 218 can receive the data carried in the infrared signal and place the data on the bus 218. The bus 218 carries the data to the main memory 204, from which the processor 202 retrieves and executes the instructions. The instructions received by the main memory 204 may optionally be stored on the storage device 208 either before or after execution by the processor 202.

The server 200 may also include a communication interface 216 coupled to the bus 218. The communication interface 216 provides a two way data communication coupling between the server 200 and, for example, the database 105. For example, the communication interface 216 may be an integrated services digital network (ISDN) card or a modem used to provide a data communication connection to a corresponding type of telephone line. As another example, the communication interface 216 may be a local area network (LAN) card used to provide a data communication connection to a compatible LAN. Wireless links may also be implemented. In any such implementation, the communication interface 216 sends and receives electrical, electromagnetic, optical, or other signals that carry digital data streams representing various types of information.

The storage device 208 can further include instructions for carrying out various processes for gathering information about individuals and accessing reference data for purposes of performing an anti-money laundering risk assessment described herein when executed by the processor 202. The storage device 208 can further include a database for storing customer attributes and reference data.

The previous description is of embodiment(s) for implementing the methods and systems described herein, and the scope should not be limited by this description. The scope is instead defined by the following claims.

What is claimed is:

1. A computer-implemented method of assessing money-laundering risk of an individual, the method comprising: using a server comprising at least one processor configured for: gathering, geographic information, personal information, and product information regarding the individual, the product information including information regarding a product of a financial institution purchased by the individual; determining a risk value of the geographic information, a risk value of the personal information, and a risk value of the product information; weighting each of the geographic information risk value, the personal information risk value, and the product information risk value; summing the weighted values to yield a money-laundering risk score; determining whether the geographic information, personal information, and product information include an overriding risk attribute, wherein overriding risk attributes are a subset including one or more of the plurality of geographic-, personal-, and product-information-components that are particular risk components requiring enhanced consideration, and an individual risk value associated therewith; determining a trump score for each determined overriding risk attribute and the individual risk value associated therewith; comparing the money-laundering risk score to each determined trump score of each determined overriding risk attribute; replacing the calculated money-laundering risk score with a maximum of the respective determined trump scores of each determined overriding risk attribute when at least one of the respective trump scores exceeds the calculated money-laundering risk score; and using a resulting selection of the calculated money-laundering risk score or the maximum of the respective determined trump scores to assess the money-laundering risk of the individual.

2. The method of claim 1, wherein the step of determining the risk value of the geographic information, the risk value of the personal information, and the risk value of the product information comprises:
   determining a risk value of each of a plurality of geographic information components;
   weighting each of the plurality of geographic-information-component risk values;
   summing the weighted plurality of geographic-information-component risk values;
   determining a risk value of each of a plurality of personal information components;
   weighting each of the plurality of personal-information-component risk values;
   summing the weighted plurality of personal-information-component risk values;
   determining a risk value of each of a plurality of product information components;
   weighting each of the plurality of product-information-component risk values; and
   summing the weighted plurality of personal-information-component risk values.

3. The method of claim 1, wherein the product information comprises information regarding a channel used by the individual to access the financial institution.

4. The method of claim 1, wherein the personal information comprises at least one of citizenship, occupation, status with a financial institution, and length of a relationship with the financial institution.

5. The method of claim 1, thither comprising flagging the individual for heightened scrutiny responsive to the money-laundering risk score exceeding a threshold.

6. The method of claim 1, wherein the geographic information comprises at least one of city, state, country, postal code, and telephone number.

7. A computer implemented system for assessing money-laundering risk of an individual, the system comprising: a server comprising at least one processor configured to: gather geographic information, personal information, and product information regarding the individual, the product information including information regarding a product of a financial institution purchased by the individual; determining a risk value of the geographic information, a risk value of the personal information, and a risk value of the product information; weight each of the geographic information risk value, the personal information risk value, and the product information risk value; sum the weighted values to yield a money-laundering risk score; determine whether the geographic information, personal information, and product information include an overriding risk attribute, wherein overriding risk attributes are a subset including one or more of the plurality of geographic-, personal-, and product-information-components that are particular risk components requiring enhanced consideration, and an individual risk value associated therewith; determine a trump score for each determined overriding risk attribute and the individual risk value associated therewith; compare the money-laundering risk score to each determined trump score of each determined overriding risk attribute; replace the calculated money-laundering risk score with a maximum of the respective determined trump scores of each determined overriding risk attribute when at least one of the respective trump scores exceeds the money-laundering risk score; and use a resulting selection of the calculated money-laundering risk score or the maximum of the respective determined trump scores to assess the money-laundering risk of the individual; and wherein at least one database is interoperably coupled to the server.

8. The system of claim 7, wherein the determination of the risk value of the geographic information, the risk value of the personal information, and the risk value of the product information comprises:
   determining a risk value of each of a plurality of geographic information components;
   weighting each of the plurality of geographic-information-component risk values;
   summing the weighted plurality of geographic-information-component risk values;

determining a risk value of each of a plurality of personal information components;

weighting each of the plurality of personal-information-component risk values;

summing the weighted plurality of personal-information-component risk values;

determining a risk value of each of a plurality of product information components;

weighting each of the plurality of product-information-component risk values; and summing the weighted plurality of personal-information-component risk values.

9. The system of claim 7, wherein the product information comprises information regarding a channel used by the individual to access the financial institution.

10. The system of claim 7, wherein the personal information comprises at least one of citizenship, occupation, status with a financial institution, and length of a relationship with the financial institution.

11. The system of claim 7, wherein the server is adapted to flag the individual for heightened scrutiny responsive to the money-laundering risk score exceeding a threshold.

12. The system of claim 7, wherein the geographic information comprise at least one of city, state, country, postal code, and telephone number.

13. An article of manufacture for assessing money-laundering risk of an individual on a computer system, the article of manufacture comprising: at least one computer readable medium; computer readable instructions contained on the at least one computer readable medium, the computer readable instructions configured to be readable from the at least one computer readable medium by at least one processor of a computer to: gather, geographic information, personal information, and product information regarding the individual, the product information including information regarding a product of a financial institution purchased by the individual; determining a risk value of the geographic information, a risk value of the personal information, and a risk value of the product information; weight each of the geographic information risk value, the personal information risk value, and the product information risk value; sum the weighted values to yield a money-laundering risk score; determining whether the geographic information, personal information, and product information include an overriding risk attribute, wherein overriding risk attributes are a subset including one or more of the plurality of geographic-, personal-, and product-information-components that are particular risk components requiring enhanced consideration, and an individual risk value associated therewith; determine a trump score for each determined overriding risk attribute and the individual risk value associated therewith; compare the money-laundering risk score to each determined trump score of each determined overriding risk attribute; replace the money-laundering risk score with a maximum of the respective determined trump scores of each determined overriding risk attribute when at least one of the respective trump scores exceeds the calculated money-laundering risk score; and use a resulting selection of the calculated money-laundering risk score or the maximum of the respective determined trump scores to assess the money-laundering risk of the individual.

14. The article of manufacture of claim 13, wherein the determination of the risk value of the geographic information, the risk value of the personal information, and the risk value of the product information comprises:

determining a risk value of each of a plurality of geographic information components;

weighting each of the plurality of geographic-information-component risk values;

summing the weighted plurality of geographic-information-component risk values;

determining a risk value of each of a plurality of personal information components;

weighting each of the plurality of personal-information-component risk values;

summing the weighted plurality of personal-information-component risk values;

determining a risk value of each of a plurality of product information components;

weighting each of the plurality of product-information-component risk values; and summing the weighted plurality of personal-information-component risk values.

15. The article of manufacture of claim 13, wherein the product information comprises information regarding a channel used by the individual to access the financial institution.

16. The article of manufacture of claim 13, wherein the personal information comprises at least one of citizenship, occupation, status with a financial institution, and length of a relationship with the financial institution.

17. The article of manufacture of claim 13, wherein the processor instructions are configured to cause the at least one processor to operate as to flag the individual for heightened scrutiny responsive to the money-laundering risk score exceeding a threshold.

18. The article of manufacture of claim 13, wherein the geographic information comprise at least one of city, state, country, postal code, and telephone number.

* * * * *